United States Patent
Kjartanson

(10) Patent No.: US 8,669,514 B2
(45) Date of Patent: Mar. 11, 2014

(54) ARRANGEMENT OF SENSORS IN A SEED COUNTING APPARATUS FOR A PLANTER MONITOR

(75) Inventor: Dwight Kjartanson, Winnipeg (CA)

(73) Assignee: Parker Hannifin Canada, Winnipeg, MB (CA)

( * ) Notice: Subject to any disclaimer, the term of this patent is extended or adjusted under 35 U.S.C. 154(b) by 525 days.

(21) Appl. No.: 13/049,350

(22) Filed: Mar. 16, 2011

(65) Prior Publication Data

US 2011/0226939 A1 Sep. 22, 2011

Related U.S. Application Data

(60) Provisional application No. 61/314,247, filed on Mar. 16, 2010.

(51) Int. Cl.
*G06M 7/00* (2006.01)

(52) U.S. Cl.
USPC ..................................... 250/223 R; 250/221

(58) Field of Classification Search
USPC ...... 250/221, 237 R, 559.01, 559.03, 559.07, 250/559.12, 559.47, 222.1, 214 R, 559.15, 250/559.4, 222.2, 239; 340/600, 603, 606, 340/609, 612, 540; 356/54, 335, 213, 229, 356/242.1, 5.07, 5.08; 377/6, 53; 221/174; 111/916
See application file for complete search history.

(56) References Cited

U.S. PATENT DOCUMENTS

| | | | |
|---|---|---|---|
| 3,422,776 A | 1/1969 | Gregory, Jr. | |
| 3,537,091 A * | 10/1970 | Schenkenberg | 377/6 |
| 4,054,779 A * | 10/1977 | Wilke | 377/6 |
| 4,166,948 A | 9/1979 | Steffen | |
| 4,260,882 A * | 4/1981 | Barnes | 250/205 |
| 4,555,624 A | 11/1985 | Steffen | |
| 4,635,215 A | 1/1987 | Friend | |
| 5,883,383 A * | 3/1999 | Dragne | 250/222.2 |
| 5,936,234 A * | 8/1999 | Thomas et al. | 250/222.2 |
| 6,093,926 A * | 7/2000 | Mertins et al. | 250/222.1 |
| 6,710,326 B2 | 3/2004 | Okamoto | |

FOREIGN PATENT DOCUMENTS

GB    1506651    10/1975

* cited by examiner

*Primary Examiner* — Que T Le
*Assistant Examiner* — Jennifer Bennett
(74) *Attorney, Agent, or Firm* — Adrian D. Battison; Ade & Company Inc.

(57) ABSTRACT

A counter for seeds in a duct includes a first point source transmitter on a first mounting on one side of the duct spaced outwardly from the duct so as to project light through a front wall and a set of phototransistors in a transverse row carried on a second mounting on a rear wall. The side walls of the duct lie on a triangle with an apex at the light source. The phototransistors are connected in series so that the output current is determined by that phototransistor on which the majority of the shadow from the seed falls. In this way the momentary reduction in current output has a larger amplitude to better distinguish from dust in the duct. The duct is formed by a housing attached to the peripheral wall of the metering device with a seed transport tube attached to the bottom of the housing.

23 Claims, 8 Drawing Sheets

ARRANGEMENT OF SENSORS IN A SEED COUNTING APPARATUS FOR A PLANTER MONITOR

This application claims the benefit under 35 USC 119 of the priority of Provisional Application 61/314,247 filed Mar. 16, 2010.

This invention relates to a seed counting apparatus for use in a planter monitor for generating a seed count value in response to a series of seeds moving through a seed transport duct of the planter.

BACKGROUND OF THE INVENTION

While various techniques have been explored for detecting seeds falling in a tube, the most commonly used technique is that of a light source and photo sensor which detect the passage of seeds by counting pulses generated by the momentary reduction in light intensity from the steady state intensity caused by the passage of a seed between the light source and the sensor.

The vast majority of products of this type actually manufactured and sold in the marketplace have been manufactured by Dickey-John Corporation and they have obtained issue of a number of patents in this field. In particular the following patents of Dickey-John have some relevance in this field.

U.S. Pat. No. 3,723,989 (Fathauer) discloses an arrangement in which the intensity of the light source is varied to accommodate changes in reception by the sensor due to dirt or dust collecting between the light source and the sensor.

U.S. Pat. No. 3,974,377 (Steffen) discloses an arrangement in which the diode transmits light across the duct to two phototransistors which are connected in parallel to generate pulse signal information across a resistor where it is amplified and filtered.

U.S. Pat. No. 4,555,624 (Steffen) discloses a technique for analyzing the pulses generated by the momentary change in intensity value by following the changes in direction in the pulse and by generating individual positive and negative square-wave pulses in response to each change in direction.

U.S. Pat. No. 4,307,390 (Steffen) discloses an arrangement including a plurality of light sensitive sensors and an arrangement in which the number of counts or pulses recorded is increased relative to the number of input signals in dependence upon which one or ones of the plurality of light sensitive sensors are activated and in dependence upon the rate at which the signals are produced.

U.S. Pat. No. 4,166,948 (Steffen) discloses an arrangement in which the amplitude of the pulses is maintained above a predetermined minimum value by the sensor circuit, despite reductions in light intensity due to the accumulation of dirt and dust.

U.S. Pat. No. 5,635,911 (Landers) discloses an algorithm for calculating a seed count from pulses generated by the photo-transistor.

U.S. Pat. No. 4,491,241 (Knepler) a plurality of sensor circuits coupled in series circuit, one of the sensor circuits being coupled intermediate each of the sensors and a common signal line.

As set out in the above patents, one problem which arises in relation to seed counters of this type relates to the accumulation of dust and dirt which can vary the intensity of light normally received by the sensor.

A yet further problem relates to the geometry of the light source and the sensor which can either leave areas of the duct which are not properly monitored or can generate spurious reflections thus distorting the pulses.

Another arrangement which has become widely used is that manufactured by the present Assignees which is shown and described in U.S. Pat. No. 5,883,383 (Dragne) issued Mar. 16, 1999, U.S. Pat. No. 5,969,340 (Dragne) issued Oct. 19, 1999. Another patent relevant to this field is U.S. Pat. No. 6,661,514 (Tevs) issued Dec. 9, 2003.

The sensor unit it typically mounted on a seeder in the seed delivery duct at a position thereon downstream of the metering system and spaced from the discharge end of the duct. One problem which has arisen with arrangements of this type has been that of dust arising from the discharge end of the duct. This problem is particularly exacerbated by the use of so-called vacuum metering systems of the type shown for example in U.S. Pat. No. 7,152,542 (Eben) issued Dec. 26, 2006 to Kinze. This discloses an air seed meter for an agricultural planter, which has a vacuum chamber defining central opening, where atmospheric pressure is applied to vacuum side of the seed cells, when a seed orifice passes beneath the terminating end wall of the vacuum chamber.

Dust is stirred up through the process of planting and this can generate a signal similar to a seed resulting in a false count. This is due to the fact that dust moving through the tube may block a similar percentage of the light transmitted from the emitter to the detector as would be blocked by a seed. With the current design shown in the above patents of the present Assignees, a seed passing through the beam might obstruct 5% of the light. This reduction in photocurrent is amplified and if of sufficient amplitude, will produce a seed pulse. If a puff of dusty air with 95% transmissivity moves through the tube with similar passage time to a seed, the result will be a signal which is virtually indistinguishable from that produced by a seed falling through.

SUMMARY OF THE INVENTION

In general it is an object of the present invention to provide an improved seed counter for use in a planter monitor.

According to one aspect of the invention there is provided an apparatus for producing a seed count value in response to movement of seeds in a duct comprising:

a light source arranged to be mounted at one side of the duct;

a set of light sensors arranged to be mounted at an opposed side of the duct each for receiving light from the source;

the set of light sensors being arranged such that passage of a seed through the duct between the source and the set of light sensors causes a shadow of the seed to fall on at least one of the light sensors;

each light sensor being arranged to produce an output signal proportional to light intensity falling on the light sensor so as to generate a momentary change in the output signal therefrom proportional to the extent to which the shadow falls on the light sensor;

and an electronic circuit into which the set of light sensors are connected;

the light sensors and the electronic circuit being arranged so as to produce a resultant output signal where an amplitude of a momentary change in the resultant output signal in response to the passage of the seed is greater than an average change of the amplitudes in the output signals of all the light sensors of the set of light sensors.

It will be appreciated that dust in the duct will generate a reduction in light received by all of the phototransistors by an average amount and thus the reduction by an increased value will assist in distinguishing from dust.

Preferably the light sensors and the electronic circuit are arranged so that the amplitude of the momentary change in the resultant output signal in response to the passage of the seed is substantially proportional to the extent to which the shadow falls on that one or more of the light sensors which has the largest effect.

Preferably the light sensors and the electronic circuit are arranged so that the amplitude of the momentary change in the resultant output signal in response to the passage of the seed is determined solely by that one or more of the light sensors which has the largest effect.

In accordance with one simple arrangement which obtains this effect, preferably the light sensors are connected in series. This series connection has the effect that the amplitude of the momentary change in the resultant output signal in response to the passage of the seed is substantially proportional to the extent to which the shadow falls on that one or more of the light sensors which has the largest effect. As this is considerably larger than the average of all the sensors, the resultant signal is much greater in amplitude allowing the system to more effectively distinguish from dust.

In an alternative arrangement, however, the signals from all of the sensors of the row are detected and compared and the electronic circuit is arranged to select to generate the resultant output signal from that one or more of the light sensors which has the largest effect.

Preferably the light sensors and the electronic circuit are arranged so that the amplitude of the momentary change in the resultant output signal in response to the passage of the seed is substantially proportional to the extent to which the shadow falls on that one or more of the light sensors which has the largest effect.

That is, the light sensors and the electronic circuit are arranged so that the amplitude of the momentary change in the resultant output signal in response to the passage of the seed is determined solely by that one or more of the light sensors which has the largest effect.

Preferably the set of light sensors are arranged in a row transversely across the duct.

Preferably the light source is substantially a point source.

Preferably the duct includes a front wall, two side walls and a rear wall defining an interior of the duct; the light source is located at one side of the duct outside the front wall such that the light therefrom enters the duct in a beam across the front wall; the set of light sensors is arranged in a row across the rear wall parallel to the beam; and the two side walls are arranged to lie substantially on an imaginary triangle having an apex at the light source so that light from the light source causes any seed passing though any location in the interior of the duct to form a shadow from the light source on the row of light sensors.

Preferably the duct is formed in a housing where the housing defines a support for the light source spaced outwardly from the front wall of the housing.

Preferably the front and rear walls are parallel.

Preferably the light source is arranged centrally of the front wall such that the angle of each of the side walls to the front wall is the same. However other geometric arrangements can be used.

Preferably the duct is formed in a housing and wherein a seed transportation tube is connected to the housing at a bottom of the housing for carrying the seed from the housing to a seeding device.

Preferably the housing is arranged for connection to a metering device arranged for metering the seeds into the duct for supply in a metered stream to the seeding device.

Preferably the housing includes a mouth for receiving the seeds from the metering device, the mouth being formed in an arcuate wall arranged for attachment to a peripheral wall of the metering device.

Preferably the housing includes a mounting bracket for attachment of the housing to the metering device.

According to a second aspect of the invention there is provided an apparatus for producing a seed count value in response to movement of seeds in a duct comprising:

a light source arranged to be mounted at one side of the duct;

a set of light sensors arranged to be mounted at an opposed side of the duct each for receiving light from the source;

the set of light sensors being arranged such that passage of a seed through the duct between the source and the set of light sensors causes a shadow of the seed to fall on at least one of the light sensors;

and an electronic circuit into which the set of light sensors are connected for generating an output responsive to the shadow;

wherein the duct includes a front wall, two side walls and a rear wall defining an interior of the duct;

wherein the light source is located at one side of the duct outside the front wall such that the light therefrom enters the duct in a beam across the front wall;

wherein the set of light sensors is arranged in a row across the rear wall parallel to the beam;

and wherein the two side walls are arranged to lie substantially on an imaginary triangle having an apex at the light source;

so that light from the light source passes causes any seed passing though any location in the interior of the duct to form a shadow from the light source on the row of light sensors.

According to a third aspect of the invention there is provided an apparatus for producing a seed count value in response to movement of seeds in a duct comprising:

a light source arranged to be mounted at one side of the duct;

a set of light sensors arranged to be mounted at an opposed side of the duct each for receiving light from the source;

the set of light sensors being arranged such that passage of a seed through the duct between the source and the set of light sensors causes a shadow of the seed to fall on at least one of the light sensors;

each light sensor being arranged to produce an output signal proportional to light intensity falling on the light sensor so as to generate a momentary change in the output signal therefrom proportional to the extent to which the shadow falls on the light sensor;

and an electronic circuit into which the set of light sensors are connected arranged so as to produce a resultant output signal where a momentary change in the resultant output signal is generated in response to the passage of the seed;

wherein the light sensors are connected in series.

This arrangement can provide the advantages that, with the series connected detector (phototransistor) array, the photo current is determined by the darkest of the detectors, not the average illuminance as with the current design. A valid seed will result in a significant percentage of light blocked to one detector, and limit the overall current due the series configuration. The presence of dust would continue to only block a small portion of light to all of the detectors which will result in a much smaller photocurrent reduction.

As in the example described above, if a puff of dusty air with 95% transmissivity moves through the tube with similar rise and fall times to a seed, the result will be a similar signal to that which would be produced with the current design; i.e.

that which results from a 5% reduction in photocurrent. A seed falling through the tube might also obstruct 5% of the total light, but it will not be evenly distributed amongst the detectors. Instead, there would be a significantly higher reduction of incident light on perhaps one or two detectors. Because the detectors (phototransistors) are series-connected, the photocurrent is determined by the darkest one. If in this example the seed shadow cast from the point-source onto the detector array results in a 50% reduction of light on one or more detectors, the photocurrent will be reduced by 50%, and signal amplitude will be ten-fold stronger than that produced by the dust. This will allow a comparator threshold setting which produces reliable seed pulses without false pulses caused by dust.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The planter monitor of the present invention includes a central monitor unit 10 which communicates with a plurality of seeding counting sensors 11 each arranged at a respective one of a plurality of seed transfer ducts 12 so that the seeds passing through each duct are counted by the respective sensor unit 11 and information concerning the number of seeds counted is transmitted from the respective sensor unit to the central monitor unit for displaying information to the operator.

The general construction of each of the seed sensor units is shown in U.S. Pat. No. 5,883,383 (Dragne) issued Mar. 16, 1999, the disclosure of which is incorporated herein by reference.

Figure 1:
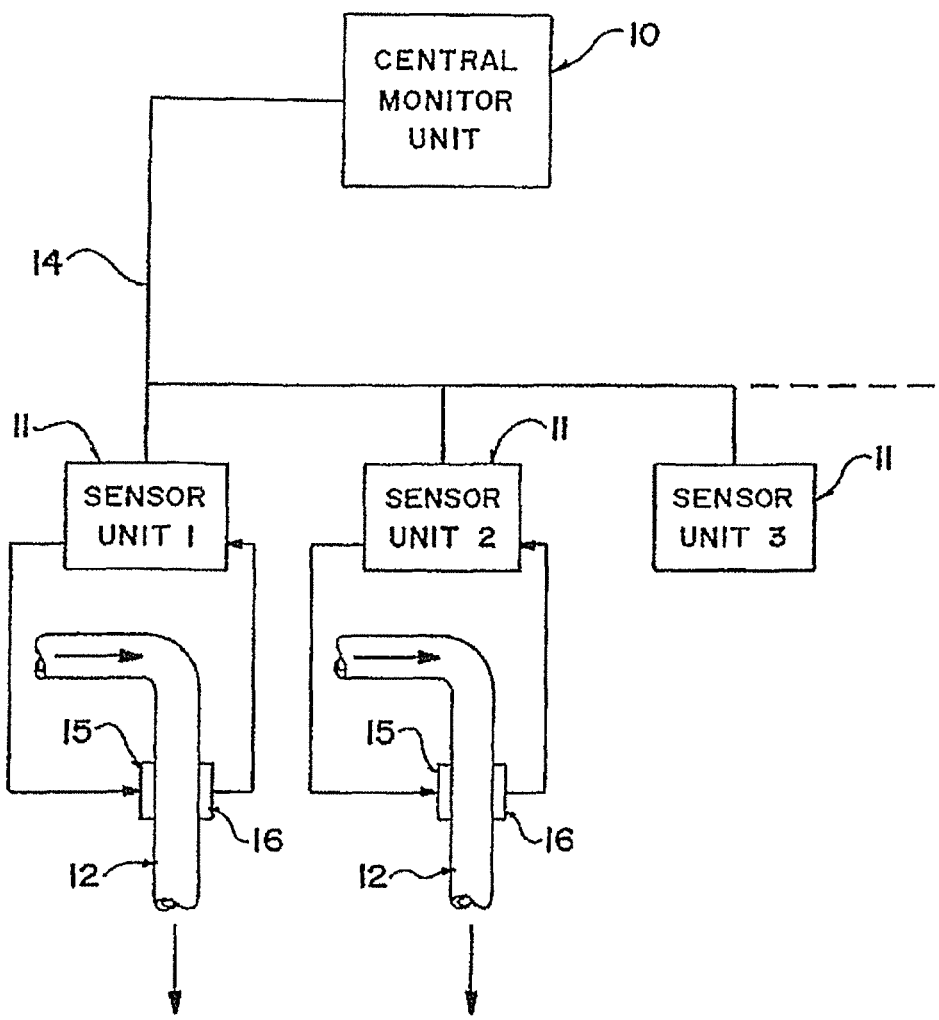
FIG. 1 is an overview of a system for counting seeds using an arrangement according to the present invention.
Figure 2:
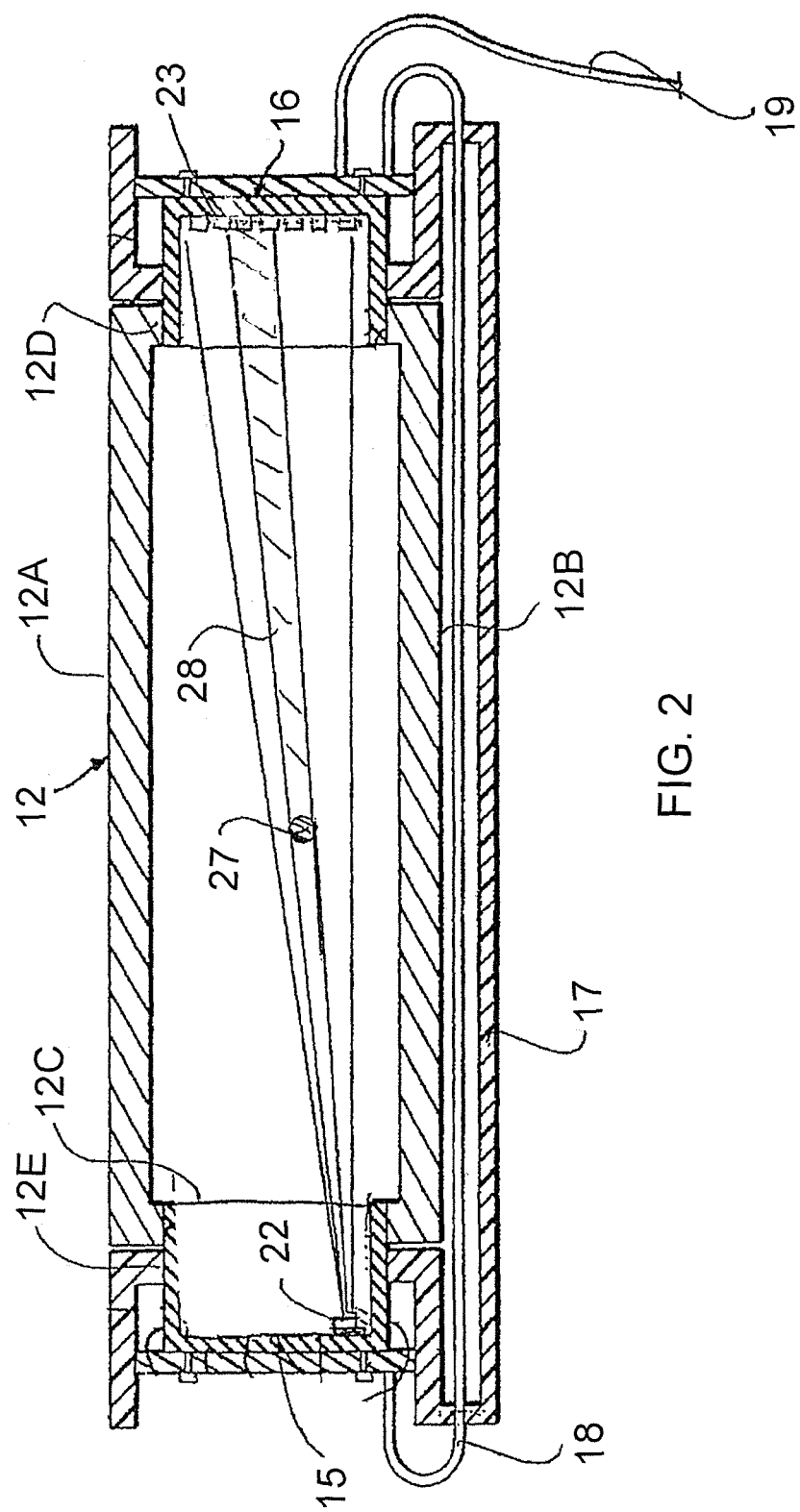
FIG. 2 is a transverse horizontal cross sectional view of one of the ducts of FIG. 1 showing the mechanical mounting of the source and sensors according to the present invention.
Figure 3:
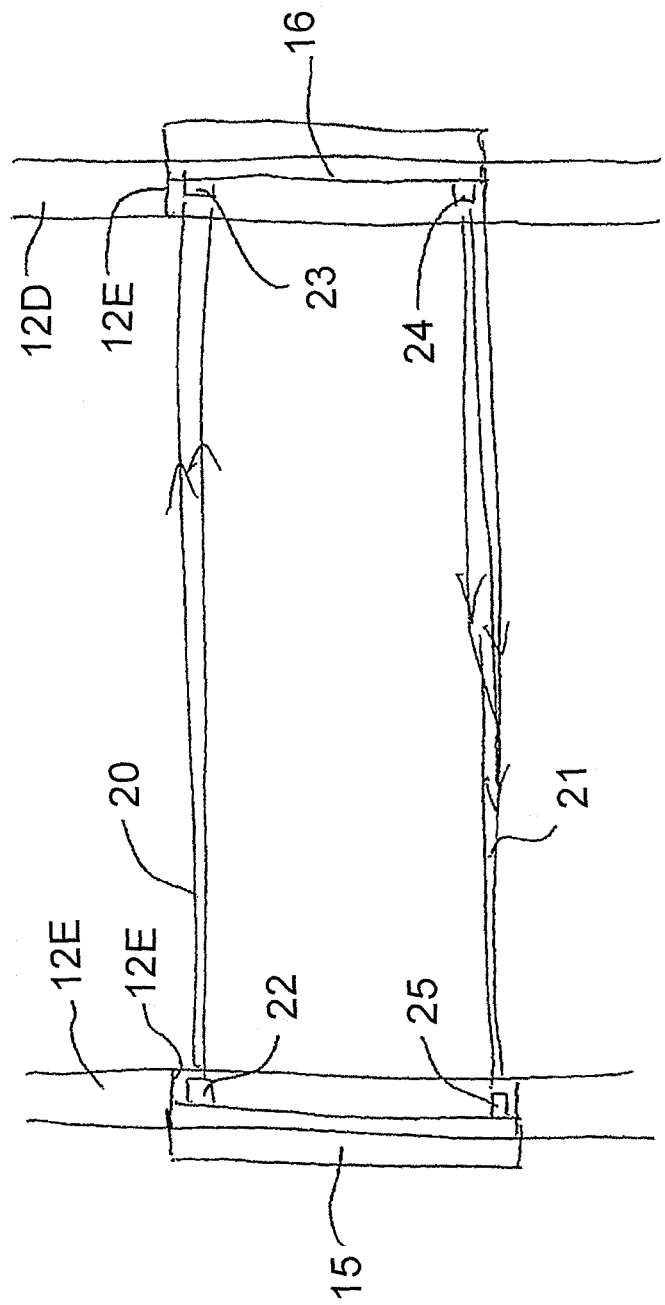
FIG. 3 is a transverse vertical cross sectional view of one of the ducts of FIG. 1 showing the mechanical mounting of the source and sensors according to the present invention.

A first embodiment is shown in FIGS. 2 and 3. In this embodiment, each seed sensor unit includes components 15 and 16 to be mounted on the duct 12. These components are shown in more detail in FIGS. 2 and 3. The duct 12 is rectangular with sides 12A and 12B which are generally longer sides with shorter sides 12C and 12D. On each of the sides 12C and 12D is formed an opening 12E into which a respective one of the components 15 and 16 is mounted for obtaining data relating to the passage of seeds through the duct 12.

The components 15 and 16 are interconnected by a mounting arrangement 17 which extends along one side 12B to connect the two components together for structural mounting on the duct and also for electrical interconnection using a cable 18 which communicates between the two components and further cable 19 which communicates to the sensor unit 11 associated with the duct 12.

The components 15 and 16 are mounted in the rectangular opening 12E in each of the side walls and are shaped so that the component extends across the full width of the conduit 12 and partly along the length of the conduit 12 at the rectangular opening 12E.

The component 15 carries upper set of light communication elements generally indicated at 20 and a lower set of communication elements 21. These communication elements in the upper set 20 include a single point source LED 22 and a row of phototransistors or receptors 23. In symmetrical manner the lower set include a transmitting LED 24 and a row of receptors 25. The LED is arranged at one side of the opening 12E adjacent one of the side walls and in the embodiment shown this is adjacent the side wall 12B. Symmetrically the LED 24 is also arranged adjacent one side and this can be the same side or the opposite side as preferred.

The point source generated by the LED on one side therefore generates a beam of light which scans across the duct 12 toward the row of receptors 23.

Assuming the absence of any reflection, the light falls on all of the receptors from the point source so that the presence of a seed or other particle 27 causes a shadow 28 to fall on some or all of the receptors and typically on a limited number of the receptors 23. As the seed is relatively small in dimension relative to the duct, this typically leaves a number of the receptors 23 which are still exposed to the light from the source 22 and therefore have no reduction in their output. Thus the shadow from which falls primarily on a limited number of the receptors and these particular receptors have a significant reduction in the output therefrom which of course is proportional to the light falling on those receptors and thus proportional to the reduction of the light caused from the shadow of the seed.

The analysis of the output from the receptors is arranged so that the resultant output signal has an amplitude which is decreased by the passage of the seed. However the analysis is arranged so that the momentary change in the resultant output signal in response to the passage of the seed is greater than an average change in the amplitudes of the output signals of all of the light sensors or receptors of the set.

Figure 4:
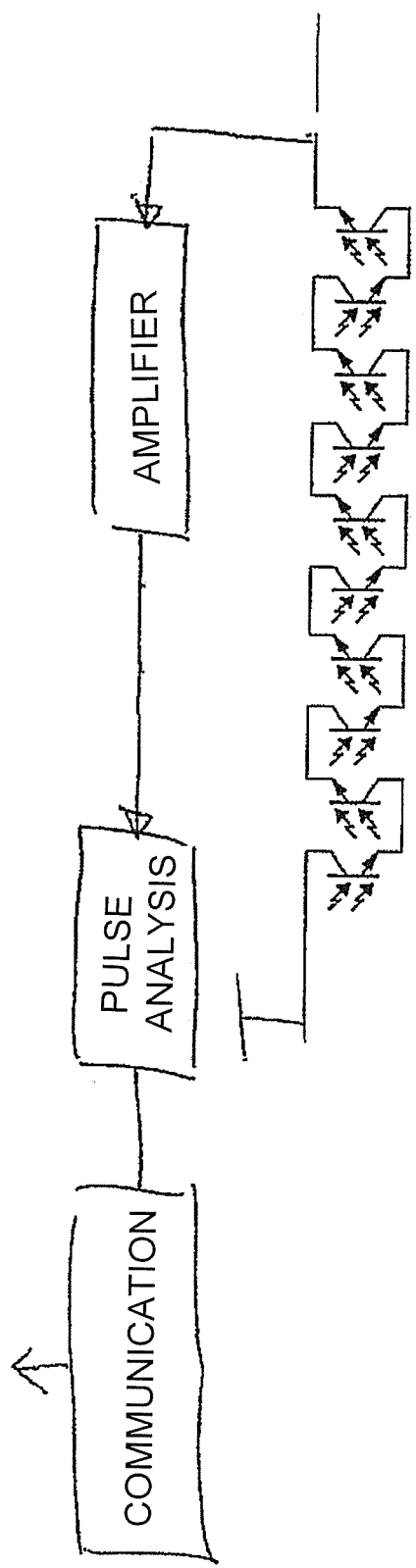
FIG. 4 is a schematic illustration of the circuit according to the present invention including the light sensors of FIGS. 2 and 3.
Figure 5:
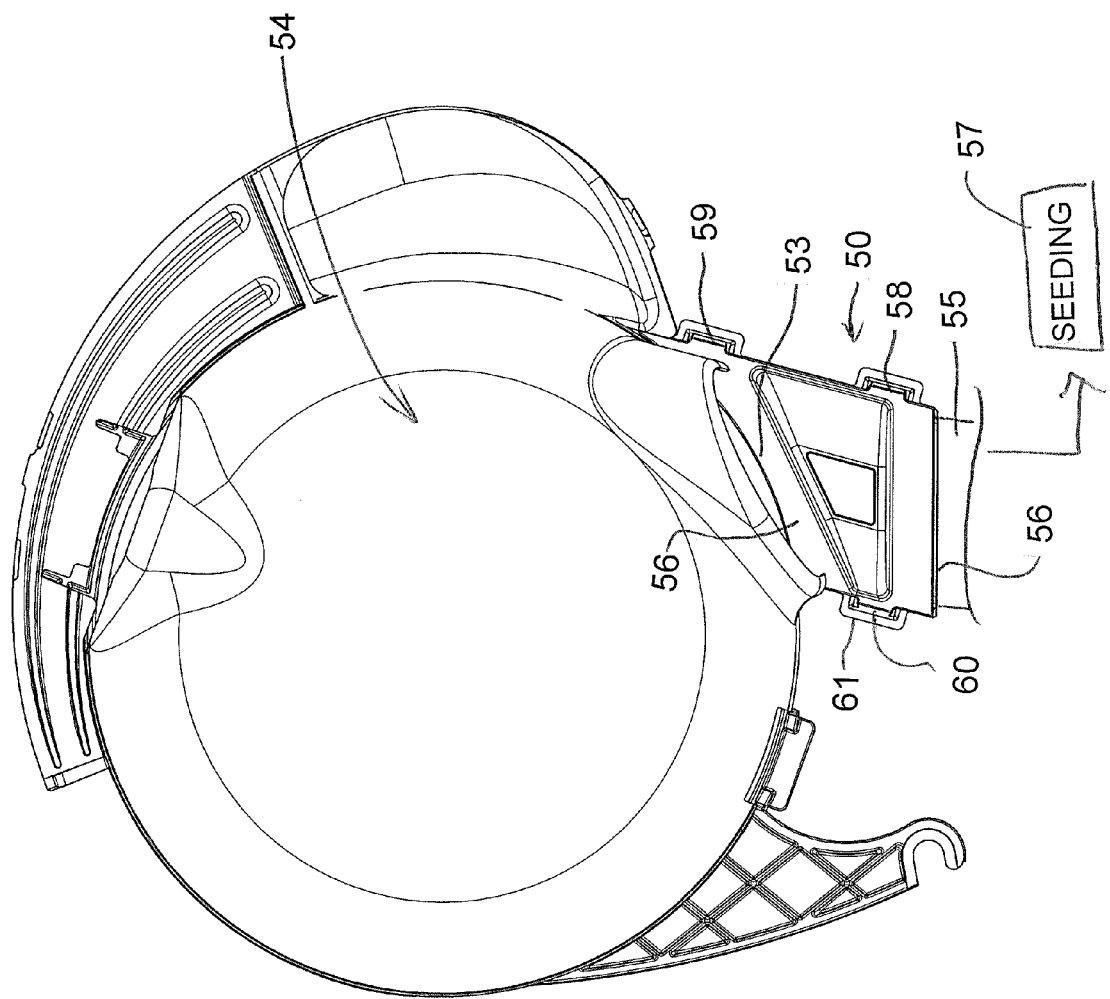
FIG. 5 is a side elevational view of a seed metering device for mounting on a planter including mounted thereon a further embodiment of the apparatus for counting seeds according to the present invention.
Figure 6:
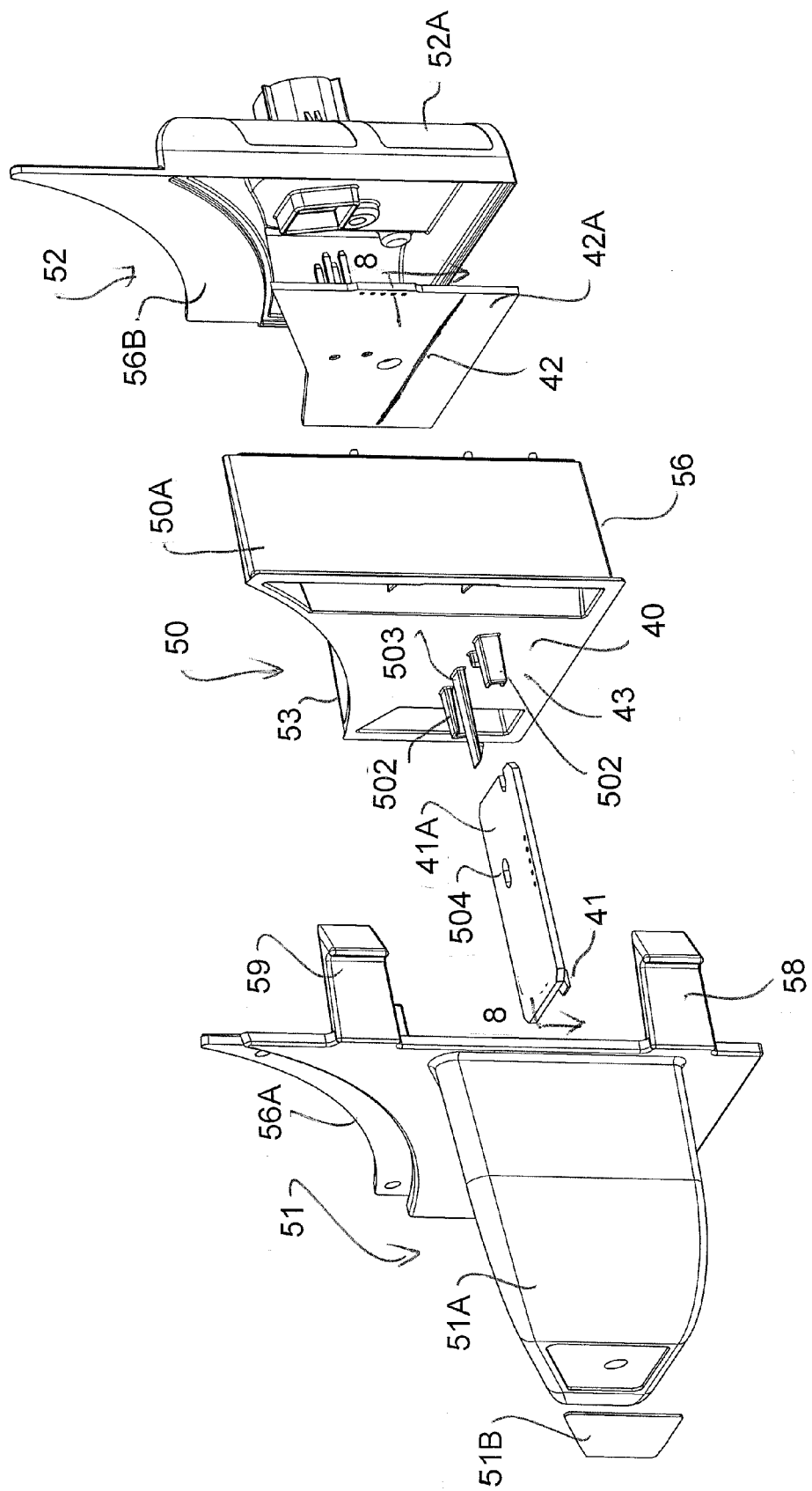
FIG. 6 is an exploded view of the apparatus for counting of FIG. 5.
Figure 7:
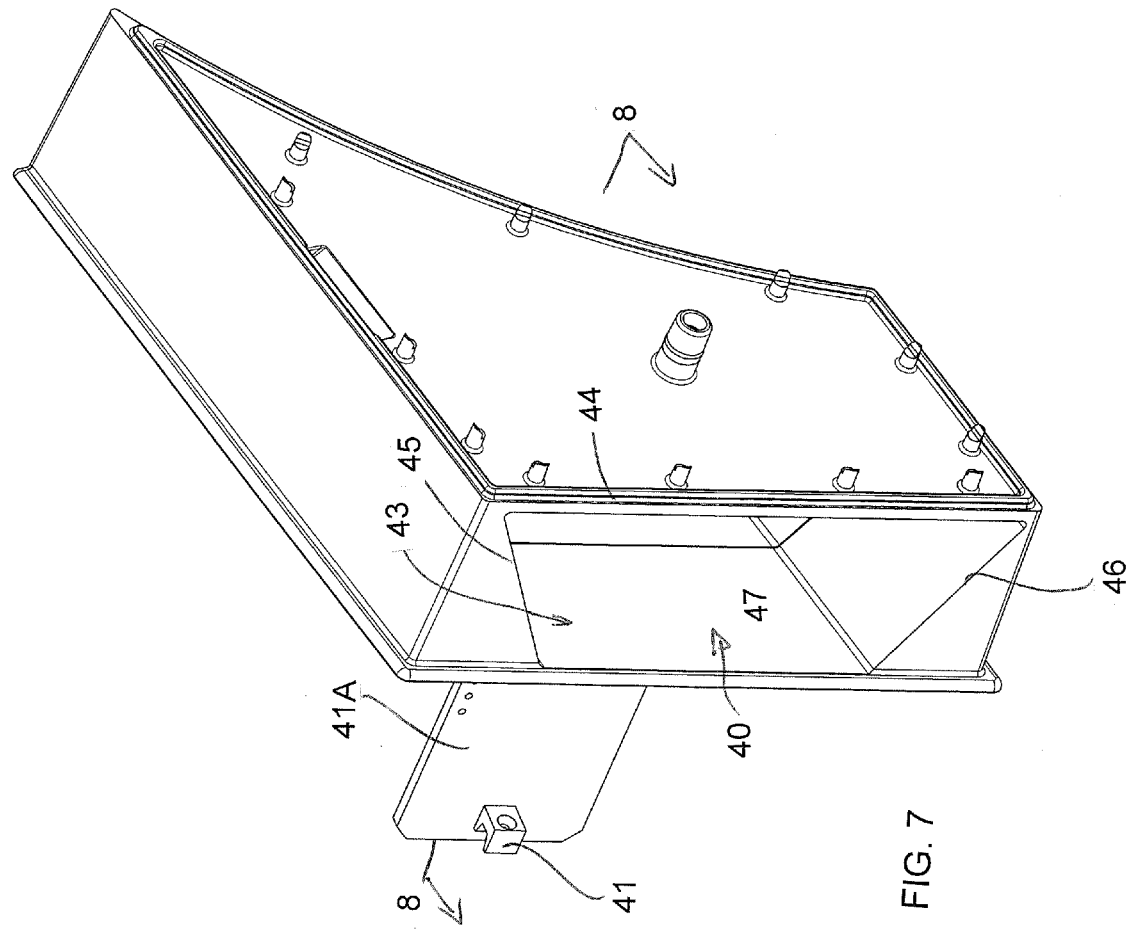
FIG. 7 is an isometric view of the apparatus for counting of FIG. 5 taken from the bottom end of the housing and showing only the main central housing portion defining the duct, with the two outer portions of the housing removed for convenience of illustration.
Figure 8:
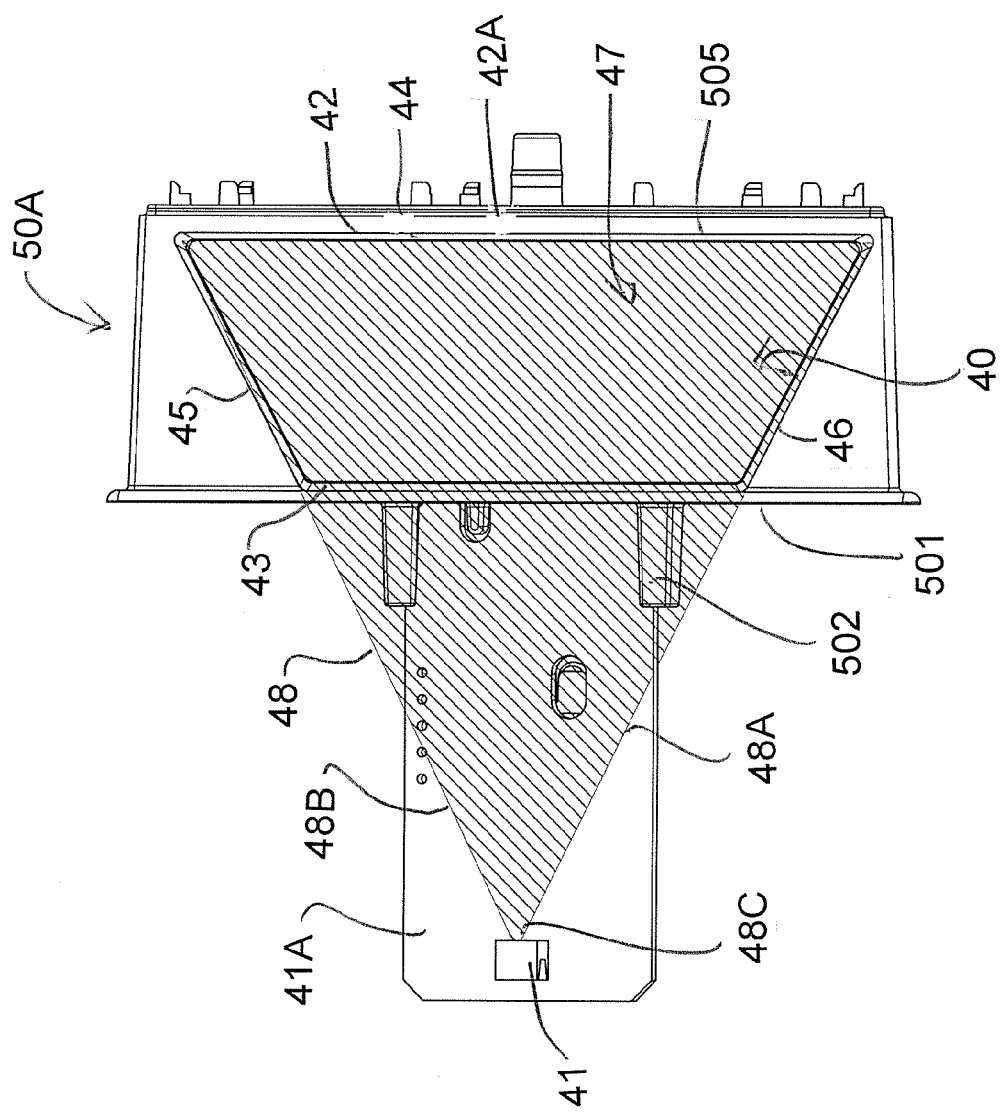
FIG. 8 is a cross-sectional view along the lines 8-8 of FIGS. 6 and 7.

In the preferred embodiment shown herein, this is arranged by placing the phototransistors in series as shown in FIG. 4. In this way the output signal has an amplitude of the momentary change in the resultant output signal which is substantially proportional to the extent to which the shadow falls on that one or more or those ones of the light sensors which have the largest effect. It will be appreciated that the series arrangement shown in FIG. 4 causes a reduction across all of the photo transistors which is proportional to the largest change in any of the photo transistors. For example if one of the photo transistors reduces its output by 50% and the others reduce their output only by 20% or some lower value, the maximum reduction of the 50% value is effectively that which is seen across the whole series of the photo transistors.

The series arrangement is only one way in which this analysis can occur and is selected because it is a simple arrangement. However it is of course also possible to individually compare the output signals from each of the photo transistors and to select as the output signal that one or more which has the largest change in amplitude. In some cases a single sensor will have the largest signal. In other cases the shadow falls equally on a number of them so that they all have the same signal. In other cases, all are covered. This can be done by receiving and detecting the output signal from each of the photo transistors and making an actual comparison therebetween. However the series arrangement in effect obtains the same result but with a simple hardware arrangement rather than a software analysis of the output signals.

It will of course be appreciated that the simple analysis based upon the absence of any reflections is in practice not what occurs and there are internal reflections from the inside surface of the duct and also from the seed. However the arrangement described above acts to maximize the effect of the shadow of the seed on a limited number of the light receptors.

However it will be appreciated that the point source on one side which is associated with a row on the other side only provides coverage of approximately one half of a duct of rectangular shape. The coverage is approximately triangular from the point source to the row. One way to overcome this problem, as shown in the second embodiment, is to provide a duct which is similarly generally triangular so that the point source and the row effectively cover the whole area of the duct.

However with ducts that are rectangular it is necessary to provide a second array using a similar row and a separate point source so as to cover the other half of the duct and thus the other triangle which is not covered by the first set. For this reason the second lower set of light components is provided as shown in FIG. 3 including the point source 24 and the receptors 25. In practice the point source 24 is arranged diagonally opposite to the point source 22 so that the light from that point source fills the other triangle to the row 25 on the same side as the point source 22. The location of the point source is arranged so that there is a slight overlap between the two triangles. In this way the whole of the rectangular area of the duct is covered by the two separate arrays. The counting of seeds therefore can be effected by detecting the momentary reduction in amplitude from either the first or the second set.

The second set is located at a position spaced longitudinally of the duct from the first set by a predetermined distance. This has the result that any seed which passes through the overlap area between the two sets would normally generate two separate signals. However by analyzing the signals received from the two sets, in the event that a signal from the second set is time delayed by a time difference approximately equal to the time necessary to traverse between the first and second sets, the second pulse can then be discounted as likely to be a duplicate of the first pulse rather than a second seed.

Also the spacing of the sets is used to reduce the effects of reflections from the source of one set on the sensors of the other set.

Turning now to the second embodiment shown in FIGS. 5 to 8, there is shown an apparatus for producing a seed count value in response to movement of seeds in a duct 40. As previously described, this includes a light source 41 mounted at a position spaced from the duct on one side of the duct 40, and a set of light sensors 42 mounted at an opposed side of the duct each for receiving light from the source. As previously described, the light sensors are connected in series as shown in FIG. 4 to obtain the effects previously described.

In this embodiment, the duct includes a front wall 43, a rear wall 44 parallel to the front wall, and two side walls 45, 46 defining an interior 47 of the duct. The light source 41 is located at one side of the duct outside the front wall 43 such that the light therefrom enters the duct through the wall 43 across the full width of the front wall 43. For this purpose, the housing is formed from a material which is transparent to infra-red light. Suitable acrylic or polycarbonate materials of this type are well known and commercially available. The set of light sensors 42 is arranged in a row across the rear wall 44 parallel to the beam from the source 41. The two side walls 45, 46 are arranged to lie substantially on an imaginary triangle 48 having two sides 48A and 48B converging to an apex 48C at the light source 41, as shown best in FIG. 8.

In this way light from the light source 41 passes through the wall 43 and causes any seed passing though any location in the interior of the duct to cause a shadow from the light source on the row of light sensors 42 carried on a circuit board 42A. This is because the whole of the interior 47 is illuminated and all light from the source 41 within that interior falls onto the sensors 42.

The light source 41 is arranged centrally of the front wall such that the triangle 48 is an isosceles triangle with the angle of each of the side walls to the front wall being the same. The source 41 is spaced outwardly from the wall 43 by a distance such that the converging sides 45 and 46 differ from a rectangle by angles which do not interfere with the operation of the duct to carry the seeds from the mouth at the seeding device to the seed tube.

The duct 40 is formed in a housing 50 with a center portion 50A, a first side portion 51 and a second side portion 52. The side portion 51 of the housing 50 defines a support for a circuit board 41A carrying the light source 41 spaced outwardly from the front wall 43 of the housing.

The duct 40 is therefore formed by the housing 50 which extends from a mouth 53 at the seed metering device 54 to a seed transportation tube 55 which is connected to the housing 50 at a bottom 56 of the housing for carrying the seed from the housing to a seeding device schematically indicated at 57.

The housing is formed in three pieces 50A, 51 and 52 connected together at cooperating faces 501 and 505 by adhesive. The center piece 50A defines the duct 40 and provides supports for the circuit boards 41A and 42A. Thus the housing 50A at the side 501 thereof includes two elements 502 forming a track for the edges of the board 41A and a snap finger 503 to engage into a hole 504 to hold the edge of the board 41A against the wall side 501 at the wall 43 with the board extending outwardly at right angles to the wall 42 and parallel to the strip of sensors 42. In this way the beam of light from the source 41 extends parallel to the board 41A through the wall 43 to impact on the sensors 42 at the wall 44.

The board 42A lies flat against the side 505 of the portion 50A and thus presents the row of sensors 42 against the wall 44. The housing portions 51 and 52 are shaped to carry the boards 41A and 42A and the electronics associated therewith. The housing portions 51 and 52 each include a flange 56A, 56B each on a respective side of the mouth 53 for attachment of the housing 50 to the seed metering device 54. The housing portion 51 carries three prongs 58, 59 and 60 which project across the housing portion 50A to engage with suitable components 61 of the metering device 54. The housing portions 51 and 52 include hollow components 51A and 52A projecting outwardly to respective sides of the side faces 502 and 505 of the center portion 50A with suitable cover components 51B providing access for wiring and the like.

The details of the metering device are not shown since these are well known to persons skilled in this art and can vary depending on the manufacturer of this component. Thus it suffice to say that the metering device receives seeds from a supply tank at an upper end and deposits the seeds in a metered stream through an outlet opening in a peripheral wall into the housing 50. For this purpose the housing includes mounting bracket 56 defined by the flanges 56A and 56B at the mouth 53 for mounting the housing on the metering device. The mouth forms an opening in an arcuate wall arranged for attachment to the peripheral wall of the metering device over the discharge opening therein.

Thus the counting of the seeds takes place in specially designed and dedicated housing located at the outlet of the metering device at a location up stream of the transportation duct 55 rather than as part of the duct 55 itself. Thus the housing construction can be formed with an interior duct shape best suited to allow the triangular pattern of the monitoring unit to be used.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. Apparatus for producing a seed count value in response to movement of seeds in a duct comprising:
    a light source arranged to be mounted at one side of the duct;
    a set of light sensors arranged to be mounted at an opposed side of the duct each for receiving light from the source;
    the set of light sensors being arranged such that passage of a seed through the duct between the source and the set of light sensors causes a shadow of the seed to fall on at least one of the light sensors;
    each light sensor being arranged to produce an output signal proportional to light intensity falling on the light sensor so as to generate a momentary change in the output signal therefrom proportional to the extent to which the shadow falls on the light sensor;
    and an electronic circuit into which the set of light sensors are connected;
    the light sensors and the electronic circuit being arranged so as to produce a resultant output signal where an amplitude of a momentary change in the resultant output signal in response to the passage of the seed is greater than an average change of the amplitudes in the output signals of all the light sensors of the set of light sensors.

2. The apparatus according to claim 1 wherein the light sensors and the electronic circuit are arranged so that the amplitude of the momentary change in the resultant output signal in response to the passage of the seed is substantially proportional to the extent to which the shadow falls on that one or more of the light sensors which has the largest effect.

3. The apparatus according to claim 1 wherein the light sensors and the electronic circuit are arranged so that the amplitude of the momentary change in the resultant output signal in response to the passage of the seed is determined solely by that one or more of the light sensors which has the largest effect.

4. The apparatus according to claim 1 wherein the electronic circuit is arranged to receive the output signals of all of the light sensors and to select to generate the resultant output signal that one or more of the light sensors which has the largest effect.

5. The apparatus according to claim 1 wherein the set of light sensors are arranged in a row transversely across the duct.

6. The apparatus according to claim 1 wherein the light source is substantially a point source.

7. The apparatus according to claim 1 wherein the light sensors are connected in series.

8. The apparatus according to claim 1 wherein the duct includes a front wall, two side walls and a rear wall defining an interior of the duct;
    wherein the light source is located at one side of the duct outside the front wall such that the light therefrom enters the duct in a beam extending across the front wall;
    wherein the set of light sensors is arranged in a row across the rear wall parallel to the beam;
    and wherein the two side walls are arranged to lie substantially on an imaginary triangle having an apex at the light source;
    so that light from the light source causes any seed passing though any location in the interior of the duct to form a shadow from the light source on the row of light sensors.

9. The apparatus according to claim 8 wherein the duct is formed in a housing where the housing defines a support for the light source spaced outwardly from the front wall of the housing.

10. The apparatus according claim 8 wherein the front and rear walls are parallel.

11. The apparatus according to claim 8 wherein the light source is arranged centrally of the front wall such that the angle of each of the side walls to the front wall is the same.

12. The apparatus according to claim 8 wherein the duct is formed in a housing and wherein a seed transportation tube is connected to the housing at a bottom of the housing for carrying the seed from the housing to a seeding device.

13. The apparatus according to claim 12 wherein the housing is arranged for connection to a metering device arranged for metering the seeds into the duct for supply in a metered stream to the seeding device.

14. The apparatus according to claim 13 wherein the housing includes a mouth for receiving the seeds from the metering device, the mouth being formed in an arcuate wall arranged for attachment to a peripheral wall of the metering device.

15. The apparatus according to claim 14 wherein the housing includes a mounting bracket for attachment of the housing to the metering device.

16. Apparatus for producing a seed count value in response to movement of seeds in a duct comprising:
    a light source arranged to be mounted at one side of the duct;
    a set of light sensors arranged to be mounted at an opposed side of the duct each for receiving light from the source;
    the set of light sensors being arranged such that passage of a seed through the duct between the source and the set of light sensors causes a shadow of the seed to fall on at least one of the light sensors;
    and an electronic circuit into which the set of light sensors are connected for generating an output responsive to the shadow;
    wherein the duct includes a front wall, two side walls and a rear wall defining an interior of the duct;
    wherein the light source is located at one side of the duct outside the front wall such that the light therefrom enters the duct in a beam extending across the front wall;
    wherein the set of light sensors is arranged in a row across the rear wall parallel to the beam;
    and wherein the two side walls are arranged to lie substantially on an imaginary triangle having an apex at the light source;
    so that light from the light source causes any seed passing through any location in the interior of the duct to form a shadow from the light source on the row of light sensors.

17. The apparatus according to claim 16 wherein the duct is formed in a housing where the housing defines a support for the light source spaced outwardly from the front wall of the housing.

18. The apparatus according claim 16 wherein the front and rear walls are parallel.

19. The apparatus according to claim 16 wherein the light source is arranged centrally of the front wall such that the angle of each of the side walls to the front wall is the same.

20. The apparatus according to claim 16 wherein the duct is formed in a housing and wherein a seed transportation tube is connected to the housing at a bottom of the housing for carrying the seed from the housing to a seeding device.

21. The apparatus according to claim 20 wherein the housing is arranged for connection to a metering device arranged for metering the seeds into the duct for supply in a metered stream to the seeding device.

22. The apparatus according to claim 21 wherein the housing includes a mouth for receiving the seeds from the metering device, the mouth being formed in an arcuate wall arranged for attachment to a peripheral wall of the metering device.

23. The apparatus according to claim 22 wherein the housing includes a mounting bracket for attachment of the housing to the metering device.

* * * * *